US012589671B2

(12) United States Patent
Hashimoto et al.

(10) Patent No.: US 12,589,671 B2
(45) Date of Patent: Mar. 31, 2026

(54) VEHICLE CONTROL DEVICE

(71) Applicant: TOYOTA JIDOSHA KABUSHIKI KAISHA, Toyota (JP)

(72) Inventors: Toshiya Hashimoto, Miyoshi (JP); Masato Maemura, Nisshin (JP); Ryosuke Ikemura, Susono (JP); Shogo Tsuge, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 196 days.

(21) Appl. No.: 18/411,221

(22) Filed: Jan. 12, 2024

(65) Prior Publication Data

US 2024/0286511 A1 Aug. 29, 2024

(30) Foreign Application Priority Data

Feb. 28, 2023 (JP) ................................. 2023-030165

(51) Int. Cl.
B60L 53/62 (2019.01)
B60L 53/12 (2019.01)
B60L 53/66 (2019.01)

(52) U.S. Cl.
CPC .............. B60L 53/62 (2019.02); B60L 53/12 (2019.02); B60L 53/66 (2019.02); *B60L 2240/547* (2013.01)

(58) Field of Classification Search
None
See application file for complete search history.

(56) References Cited

U.S. PATENT DOCUMENTS

| | | | | | |
|---|---|---|---|---|---|
| 7,856,295 | B2 * | 12/2010 | Zaccaria | ................. | F02C 9/285 |
| | | | | | 244/81 |
| 9,799,151 | B2 * | 10/2017 | Olson | .................. | G07C 5/0808 |
| 11,486,318 | B2 * | 11/2022 | Zaccaria | ................. | F01D 21/00 |
| 2015/0357863 | A1 * | 12/2015 | Sadakata | ................... | H02J 7/00 |
| | | | | | 320/108 |
| 2017/0077737 | A1 * | 3/2017 | Hsieh | .................... | H02M 3/335 |
| 2020/0340409 | A1 * | 10/2020 | Nguyen | ................... | F02C 9/28 |

FOREIGN PATENT DOCUMENTS

JP 2016-111873 A 6/2016

* cited by examiner

*Primary Examiner* — Peter D Nolan
*Assistant Examiner* — Jacob Kent Besteman-Street
(74) *Attorney, Agent, or Firm* — SoraIP, Inc.

(57) ABSTRACT

A vehicle control device is mounted on a vehicle that includes a power receiving device that receives power transmitted in a non-contact manner from a ground-side supply device and a battery that charges the power received by the power receiving device. The drive frequency determined based on the requested power of the side is set as the first drive frequency, and the first drive frequency is transmitted to the supply device using wide area wireless communication. When the inverter included in the supply device is controlled to the first drive frequency, the power receiving device receives the power transmitted in a contactless manner and charges the battery, and the power is transferred before and after changing the inverter drive frequency to the first drive frequency. Feedback control is performed to check whether the transmission efficiency is high.

2 Claims, 10 Drawing Sheets

POWER TRANSMISSION ECU

510

1ST COMMUNICATION
CONTROL SECTION

520

2ND COMMUNICATION
CONTROL SECTION

530

POWER TRANSMISSION
CONTROL SECTION

330

VEHICLE ECU

610

THIRD COMMUNICATION
CONTROL SECTION

620

4TH COMMUNICATION
CONTROL SECTION

630

CHARGING CONTROL SECTION

VEHICLE CONTROL DEVICE

CROSS-REFERENCE TO RELATED APPLICATION

This application claims priority to Japanese Patent Application No. 2023-030165 filed on Feb. 28, 2023 incorporated herein by reference in its entirety.

BACKGROUND

1. Technical Field

The present disclosure relates to a vehicle control device.

2. Description of Related Art

Japanese Unexamined Patent Application Publication No. 2016-111873 (JP 2016-111873 A) discloses an offline data method in which the open inductance and the coupling coefficient are applied to relational data to estimate the corresponding gap lengths, and the average gap length of both gap lengths is applied to the relational data to obtain the optimal frequency.

SUMMARY

However, with the configuration described in JP 2016-111873 A, there is a possibility that the drive frequency of the inverter on the power transmitting side cannot be changed to the optimal drive frequency for the device on the power receiving side. Additionally, when the device on the power receiving side is a device mounted on a vehicle, there is room to consider how to determine the optimal drive frequency for the device on the vehicle side in order to increase power transmission efficiency.

The present disclosure has been made in view of the above circumstances, and an object of the present disclosure is to provide a vehicle control device that can improve power transmission efficiency when power is transmitted from a supply device on the ground side to a vehicle in a non-contact manner.

The present disclosure is a vehicle control device mounted on a vehicle including a power receiving device that receives power transmitted from a supply device on a ground side in a non-contact manner, and a battery that charges the power received by the power receiving device. The vehicle control device includes a control unit that executes:

setting a drive frequency determined based on voltage of the battery and required power on the vehicle side as a first drive frequency;

transmitting the first drive frequency to the supply device using wide area wireless communication;

receiving by the power receiving device the power transmitted in a non-contact manner while the inverter included in the supply device is controlled to the first drive frequency by the supply device that has received the first drive frequency, and charging the power to the battery; and performing feedback control to determine whether power transmission efficiency is higher after changing the drive frequency of the inverter to the first drive frequency than before changing the drive frequency.

According to this configuration, the drive frequency of the inverter on the ground side can be changed to the first drive frequency based on the voltage of the battery on the vehicle side and the required power. As a result, power transmission is performed in a non-contact manner while the inverter on the ground side is driven at the optimum drive frequency for the device on the power receiving side. Thereby, power transmission efficiency can be improved.

The higher the voltage of the battery is, the lower the first drive frequency may be, and the higher the required power is, the higher the first drive frequency may be.

According to this configuration, when the battery voltage and the required power change on the power receiving side, the optimum drive frequency can be changed in accordance with the change.

The control unit may receive from the supply device feedback information regarding the power transmission efficiency when the inverter is driven at the first drive frequency, and the control unit may adjust a correlation between the voltage of the battery, the required power, and the first drive frequency based on the feedback information.

According to this configuration, the correlation between the battery voltage, the required power, and the first drive frequency can be corrected on the vehicle side based on the feedback information provided to the vehicle from the ground side.

In the present disclosure, the drive frequency of the inverter on the ground side can be changed to the first drive frequency based on the voltage of the battery on the vehicle side and the required power. As a result, power transmission is performed in a non-contact manner while the inverter on the ground side is driven at the optimum drive frequency for the device on the power receiving side. Thereby, power transmission efficiency can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a schematic diagram for explaining wide area wireless communication in a wireless power transmission system;

DETAILED DESCRIPTION OF EMBODIMENTS

Hereinafter, a vehicle control device according to an embodiment of the present disclosure will be specifically described. The present disclosure is not limited to the embodiments described below.

Figure 1:
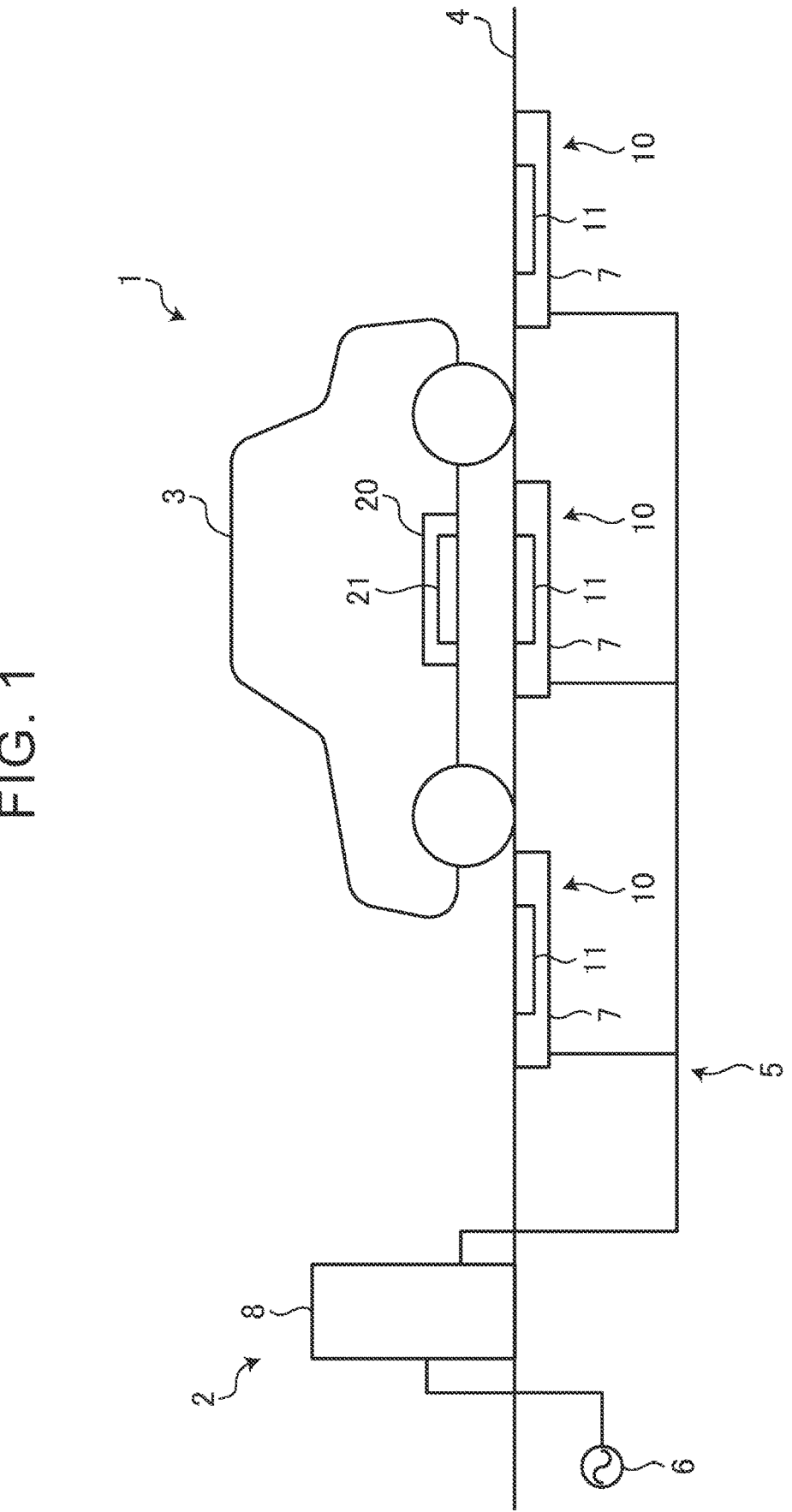
FIG. 1 is a schematic diagram showing a wireless power transmission system in an embodiment.

FIG. 1 is a schematic diagram showing a wireless power transmission system in an embodiment. The wireless power transmission system 1 includes a supply facility 2 and a vehicle 3. The supply facility 2 is equipment that supplies electric power to the running vehicle 3 in a non-contact manner. The vehicle 3 is an electrified vehicle that can be charged with electric power supplied from an external power source, such as a battery electric vehicle (BEV) or a plug-in hybrid electric vehicle (PHEV).

This wireless power transmission system 1 performs wireless power transmission from a supply facility 2 to a vehicle 3 by magnetic field resonance coupling (magnetic field resonance). The wireless power transmission system 1 transmits power from a supply facility 2 to a vehicle 3 running on a road 4 in a non-contact manner. In other words, the wireless power transmission system 1 transmits power by a magnetic resonance method, and realizes power feeding to the vehicle 3 while the vehicle 3 is running by using magnetic resonance coupling (magnetic resonance). The wireless power transmission system 1 can be expressed as a dynamic wireless power transfer (D-WPT) system or a magnetic field dynamic wireless power transfer (MF-D-WPT) system.

The supply facility 2 includes a supply device 5 and an AC power supply 6 that supplies power to the supply device 5. The supply device 5 transmits power supplied from the AC power supply 6 to the vehicle 3 in a non-contact manner. The AC power supply 6 is, for example, a commercial power source. This supply device 5 includes a power transmission device 10 having a primary coil 11.

The supply device 5 includes a segment 7 including a primary coil 11 and a management device 8 that manages the segment 7. Segment 7 is embedded within the lane of road 4. The management device 8 is installed on the side of the road 4. Segment 7 is electrically connected to management device 8. The management device 8 is electrically connected to the AC power supply 6 and supplies power from the AC power supply 6 to the segments 7. The segment 7 is electrically connected to the AC power supply 6 via the management device 8. A plurality of segments 7 can be arranged along the lanes of the road 4. For example, as shown in FIG. 1, the supply device 5 includes three segments 7 installed in line along a lane on the road 4, and one management device 8 to which the three segments 7 are connected. The segment 7 has a function of transmitting electric power from the supply device 5 to the vehicle 3 in a contactless manner. The management device 8 has a function of controlling wireless power transmission in the segment 7.

Vehicle 3 includes power receiving device 20 having secondary coil 21. The power receiving device 20 is provided at the bottom of the vehicle 3. When the vehicle 3 travels on the road 4 on which the primary coil 11 is installed, the primary coil 11 on the ground side and the secondary coil 21 on the vehicle side face each other in the vertical direction. The wireless power transmission system 1 transmits power from the primary coil 11 of the power transmission device 10 to the secondary coil 21 of the power receiving device 20 in a non-contact manner while the vehicle 3 is traveling on the road 4.

In this description, traveling means a state in which the vehicle 3 is located on the road 4 for traveling. While traveling, a state in which the vehicle 3 is temporarily stopped on the road 4 is also included. For example, a state in which the vehicle 3 is stopped on the road 4 due to waiting at a traffic light or the like is also included in the traveling state. On the other hand, even if the vehicle 3 is located on the road 4, for example, if the vehicle 3 is parked or stopped, it is not included in the running state.

In addition, in this explanation, the lane in which the primary coil 11 (segment 7) is embedded is referred to as the D-WPT lane, which is a part of the road 4 where wireless power transmission by the supply device 5 is possible. This is sometimes referred to as a D-WPT charging site. In the D-WPT lane and the D-WPT charging site, a plurality of primary coils 11 (a plurality of segments 7) are installed in line in the traveling direction of the vehicle 3 over a predetermined section of the road 4.

Figure 2:
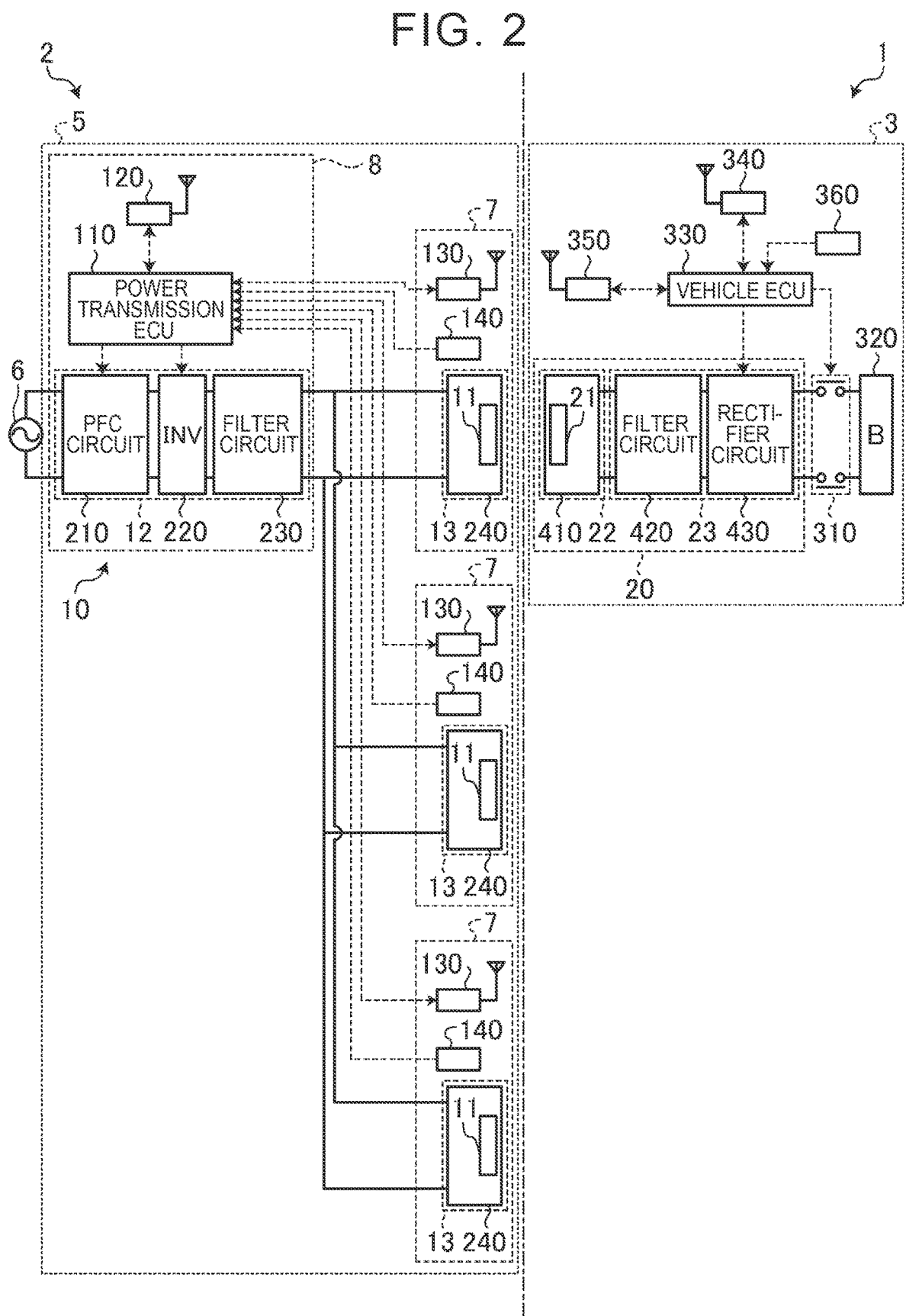
FIG. 2 is a diagram showing the overall configuration of the wireless power transmission system.

FIG. 2 is a diagram showing the overall configuration of the wireless power transmission system. In the supply facility 2, a supply device 5 and an AC power supply 6 are electrically connected. In the supply device 5, the segment 7 and the management device 8 are electrically connected.

The supply device 5 includes a configuration provided in the management device 8 and a configuration provided in the segment 7. The supply device 5 includes a power transmission device 10, a power transmission electronic control unit (ECU) 110, a first communication device 120, a second communication device 130, and a foreign object detection device 140.

Power transmission device 10 includes an electric circuit connected to AC power supply 6. The power transmission device 10 includes a Power Factor Collection (PFC) circuit 210, an inverter (INV) 220, a filter circuit 230, and a power transmission side resonance circuit 240.

PFC circuit 210 improves the power factor of AC power input from AC power supply 6, converts the AC power into DC power, and outputs the DC power to inverter 220. This PFC circuit 210 is configured including an AC/DC converter. PFC circuit 210 is electrically connected to AC power supply 6.

Inverter 220 converts DC power input from PFC circuit 210 into AC power. Each switching element of the inverter 220 is composed of an Insulated Gate Bipolar Transistor (IGBT), a Metal-Oxide-Semiconductor Field Effect Transistor (MOSFET), etc., and performs a switching operation according to a control signal from the power transmission ECU 110. For example, the driving frequency of inverter 220 is 85 kHz. Inverter 220 outputs the converted AC power to filter circuit 230.

The filter circuit 230 removes noise contained in the alternating current input from the inverter 220 and supplies the noise-free alternating current power to the power transmission side resonance circuit 240. The filter circuit 230 is an LC filter that combines a coil and a capacitor. For example, the filter circuit 230 is constituted by a T-type filter in which two coils and one capacitor are arranged in a T-shape. The PFC circuit 210, the inverter 220, and the filter circuit 230 constitute the power conversion unit 12 of the power transmission device 10.

The power transmission side resonance circuit 240 is a power transmission unit that transmits the AC power supplied from the filter circuit 230 to the power receiving device 20 in a non-contact manner. When AC power is supplied from the filter circuit 230 to the power transmission side resonance circuit 240, current flows through the primary coil 11, and a magnetic field for power transmission is generated.

The power transmission side resonance circuit 240 includes a primary coil 11 and a resonant capacitor. The primary coil 11 is a power transmission coil. This resonant capacitor is connected in series to one end of the primary coil 11, and adjusts the resonant frequency of the power transmission side resonant circuit. This resonant frequency is between 10 kHz and 100 GHz, preferably 85 kHz. For example, the power transmission device 10 is configured such that the resonance frequency of the power transmission side resonance circuit 240 and the drive frequency of the inverter 220 match. The power transmission side resonance circuit 240 constitutes the primary device 13 of the power transmission device 10.

The power transmission device 10 includes a power conversion unit 12 and a primary device 13. Power conversion unit 12 includes a PFC circuit 210, an inverter 220, and a filter circuit 230. The primary device 13 includes a power transmission side resonance circuit 240. The power transmission device 10 has a configuration in which the power conversion unit 12 is provided in the management device 8 and the primary device 13 is provided in the segment 7.

In the supply device 5, the power conversion unit 12 of the power transmission device 10, the power transmission ECU 110, and the first communication device 120 are provided in the management device 8. The primary device 13 of the power transmission device 10, the second communication device 130, and the foreign object detection device 140 are provided in the segment 7.

The power transmission ECU 110 is an electronic control device that controls the supply device 5. Power transmission ECU 110 includes a processor and a memory. The processor includes a Central Processing Unit (CPU), a Digital Signal Processor (DSP), a Field-Programmable Gate Array (FPGA), and the like. The memory is a main storage device, and includes random access memory (RAM), read only memory (ROM), and the like. The power transmission ECU 110 loads a program stored in a storage unit into a work area of a memory (main storage device) and executes it, and controls each component through the execution of the program to perform functions that meet a predetermined purpose. Realize. The storage unit is composed of recording media such as Erasable Programmable ROM (EPROM), hard disk drive (HDD), and removable media. Examples of removable media include disc recording media such as Universal Serial Bus (USB) memory, Compact Disc (CD), Digital Versatile Disc (DVD), and Blu-ray Disc (BD, registered trademark). The storage unit can store an operating system (OS), various programs, various tables, various databases, and the like. Signals from various sensors are input to power transmission ECU 110. A signal from foreign object detection device 140 is input to power transmission ECU 110. Power transmission ECU 110 then executes various controls based on signals input from various sensors.

For example, the power transmission ECU 110 executes power control to adjust power for power transmission. In power control, power transmission ECU 110 controls power transmission device 10. Power transmission ECU 110 outputs a control signal to power conversion unit 12 in order to control the power supplied from power conversion unit 12 to primary device 13. Power transmission ECU 110 controls switching elements included in PFC circuit 210 to adjust power for transmission, and controls switching elements included in inverter 220 to adjust power for transmission.

Further, power transmission ECU 110 executes communication control to control communication with vehicle 3. In communication control, power transmission ECU 110 controls first communication device 120 and second communication device 130.

The first communication device 120 is a ground-side communication device that performs wide area wireless communication. The first communication device 120 performs wireless communication with the vehicle 3 that is traveling on the road 4 and that is before approaching the WPT lane. The state before approaching the WPT lane means that the vehicle 3 is in a position where short-range wireless communication cannot be performed with the supply device 5.

Wide area wireless communication is communication with a communication distance of 10 meters to 10 kilometers. Wide area wireless communication has a longer communication distance than narrow area wireless communication. As the wide area wireless communication, various types of wireless communication having a long communication distance can be used. For example, communication conforming to communication standards such as 3GPP (registered trademark), 4G, LTE, 5G, and WiMAX established by IEEE is used for wide area wireless communication. In the wireless power transmission system 1, vehicle information linked to vehicle identification information (vehicle ID) is transmitted from the vehicle 3 to the supply device 5 using wide area wireless communication.

The second communication device 130 is a ground-side communication device that performs short-range wireless communication. The second communication device 130 performs wireless communication with a vehicle 3 that is approaching or entering the WPT lane among the vehicles 3 traveling on the road 4. A state in which the vehicle 3 is close to the WPT lane means that the vehicle 3 is in a position where short-range wireless communication can be performed with the supply device 5.

Short-range wireless communication is communication with a communication distance of less than 10 meters. Short-range wireless communication is communication that has a shorter communication distance than wide-area wireless communication. As the short-range wireless communication, various short-range wireless communications with short communication distances can be used. For example, communication conforming to any communication standard established by IEEE, ISO, IEC, etc. is used for short-range wireless communication. As an example, Wi-Fi (registered trademark), Bluetooth (registered trademark), ZigBee (registered trademark), etc. are used for short-range wireless communication. Alternatively, Radio Frequency Identification (RFID), Dedicated Short Range Communication (DSRC), or the like may be used as a technique for performing short-range wireless communication. In the wireless power transmission system 1, vehicle identification information and the like are transmitted from the vehicle 3 to the supply device 5 using short-range wireless communication.

The foreign object detection device 140 detects metal foreign objects, living organisms, etc. present above the primary coil 11. The foreign object detection device 140 is composed of, for example, a sensor coil and an imaging device installed on the ground. The foreign object detection device 140 is used to perform Foreign Object Detection (FOD) and Living Object Protection (LOP) in the wireless power transmission system 1.

In the supply device 5, the configuration of the power transmission device 10 is divided into segments 7 and management device 8, and three segments 7 are connected to one management device 8. The power transmission device 10 is configured such that one inverter supplies power to three power transmission side resonance circuits 240. Further, in the supply device 5, signals from each segment 7 are input to the management device 8. Signals from second communication device 130 and foreign object detection device 140 provided in the first segment are input to power transmission ECU 110. Similarly, signals from second communication device 130 and foreign object detection device 140 provided in the second segment are input to power transmission ECU 110. Signals from second communication device 130 and foreign object detection device 140 provided in the third segment are input to power transmission ECU 110. Power transmission ECU 110 can grasp the state of each segment 7 based on the signals input from each segment 7.

Vehicle 3 includes power receiving device 20, charging relay 310, battery 320, vehicle ECU 330, third communication device 340, fourth communication device 350, and Global Positioning System (GPS) receiver 360.

The power receiving device 20 supplies the power received from the power transmission device 10 to the battery 320. Power receiving device 20 is electrically connected to battery 320 via charging relay 310. The power receiving device 20 includes a power reception side resonance circuit 410, a filter circuit 420, and a rectifier circuit 430.

The power reception side resonance circuit 410 is a power receiving unit that receives power transmitted in a non-contact manner from the power transmission device 10. The power reception side resonance circuit 410 is configured by a power receiving side resonant circuit including the secondary coil 21 and a resonant capacitor. The secondary coil 21 is a power receiving coil that receives power transmitted from the primary coil 11 in a non-contact manner. This resonant capacitor is connected in series to one end of the secondary coil 21 and adjusts the resonant frequency of the power reception side resonance circuit 410. The resonance frequency of the power reception side resonance circuit 410 is determined to match the resonance frequency of the power transmission side resonance circuit 240.

The resonance frequency of the power reception side resonance circuit 410 is the same as the resonance frequency of the power transmission side resonance circuit 240. Therefore, when a magnetic field is generated by the power transmission side resonance circuit 240 while the power reception side resonance circuit 410 faces the power transmission side resonance circuit 240, the vibration of the magnetic field is transmitted to the power reception side resonance circuit 410. The primary coil 11 and the secondary coil 21 enter into a resonant state. When an induced current flows through the secondary coil 21 due to electromagnetic induction, an induced electromotive force is generated in the power reception side resonance circuit 410. The power reception side resonance circuit 410 receives the power transmitted in a contactless manner from the power transmission side resonance circuit 240 in this manner. The power reception side resonance circuit 410 then supplies the power received from the power transmission side resonance circuit 240 to the filter circuit 420. The power reception side resonance circuit 410 constitutes the secondary device 22 of the power receiving device 20.

The filter circuit 420 removes noise contained in the alternating current input from the power reception side resonance circuit 410 and outputs the noise-removed alternating current power to the rectifier circuit 430. Filter circuit

420 is an LC filter that combines a coil and a capacitor. For example, the filter circuit 420 is composed of a T-type filter in which two coils and one capacitor are arranged in a T-shape.

The rectifier circuit 430 converts the AC power input from the filter circuit 420 into DC power and outputs the DC power to the battery 320. The rectifier circuit 430 is configured, for example, by a full-bridge circuit in which four diodes are connected as rectifiers in a full-bridge manner. A switching element is connected in parallel to each diode of the rectifier circuit 430. Each switching element of rectifier circuit 430 is constituted by an IGBT, and performs a switching operation in response to a control signal from vehicle ECU 330. Rectifier circuit 430 supplies the converted DC power to battery 320. The filter circuit 420 and the rectifier circuit 430 constitute the power conversion unit 23 of the power receiving device 20.

The power receiving device 20 includes a secondary device 22 and a power conversion unit 23. Secondary device 22 includes a power reception side resonance circuit 410. Power conversion unit 23 includes a filter circuit 420 and a rectifier circuit 430.

Charging relay 310 is provided between rectifier circuit 430 and battery 320. The opening/closing state of charging relay 310 is controlled by vehicle ECU 330. When the battery 320 is charged by the power transmission device 10, the charging relay 310 is controlled to be closed. When charging relay 310 is closed, rectifying circuit 430 and battery 320 are electrically connected. When charging relay 310 is open, the connection between rectifier circuit 430 and battery 320 is disabled. For example, when charging relay 310 is in an open state, vehicle 3 does not request power supply.

The battery 320 is a rechargeable DC power supply, and is composed of, for example, a lithium ion battery or a nickel metal hydride battery. The battery 320 stores power supplied from the power transmission device 10 to the power receiving device 20. Also, the battery 320 can supply electric power to the driving motor of the vehicle 3. The battery 320 is electrically connected to the driving motor via a power control unit (PCU). The PCU is a power conversion device that converts the DC power of the battery 320 into AC power and supplies it to the driving motor. Each switching element of the PCU is composed of an IGBT, and performs a switching operation in response to control signals from the vehicle ECU 330 and the like.

Vehicle ECU 330 is an electronic control unit that controls vehicle 3. The vehicle ECU 330 has the same hardware configuration as the power transmission ECU 110. Signals from various sensors mounted on the vehicle 3 are input to the vehicle ECU 330. A positioning signal received by a GPS receiver 360 is also input to the vehicle ECU 330. The vehicle ECU 330 can acquire current position information of the vehicle 3 from the GPS receiver 360. Vehicle ECU 330 executes various controls based on signals input from various sensors.

For example, the vehicle ECU 330 performs contactless charging control to transfer power from the primary coil 11 to the secondary coil 21 in a contactless manner and store the power received by the secondary coil 21 in the battery 320. In contactless charging control, vehicle ECU 330 controls rectifier circuit 430, charging relay 310, third communication device 340 and fourth communication device 350. The non-contact charging control includes power control that controls charging power and communication control that controls communication with the supply device 5. In power control, vehicle ECU 330 controls switching elements included in rectifier circuit 430 to adjust power (charging power) supplied from power receiving device 20 to battery 320. In communication control, vehicle ECU 330 controls third communication device 340 and fourth communication device 350.

The third communication device 340 is a vehicle-side communication device that performs wide area wireless communication. The third communication device 340 wirelessly communicates with the first communication device 120 of the supply device 5 before the vehicle 3 traveling on the road 4 approaches the WPT lane. Wide area wireless communication is two-way wireless communication. Communication between the first communication device 120 and the third communication device 340 is performed by high-speed wireless communication.

The fourth communication device 350 is a vehicle-side communication device that performs short-range wireless communication. The fourth communication device 350 wirelessly communicates with the second communication device 130 of the supply device 5 when the vehicle 3 approaches or enters the WPT lane. Short-range wireless communication is unidirectional wireless signaling. Unidirectional wireless signaling is Point to point signaling (P2PS). P2PS is used to notify vehicle identification information from the vehicle 3 to the supply device 5 in each activity of pairing, alignment check, magnetic coupling check, execution of power transfer, and termination of power transfer. P2PS can also be used as a means of checking lateral alignment. The lateral direction refers to the width direction of the lane and the width direction of the vehicle 3.

GPS receiver 360 detects the current position of vehicle 3 based on positioning information obtained from a plurality of positioning satellites. Current position information of the vehicle 3 detected by the GPS receiver 360 is transmitted to the vehicle ECU 330.

Note that in the supply device 5, the filter circuit 230 may be included in the management device 8 instead of the segment 7. That is, the filter circuit 230 may be installed on the side of the road 4. In this case, the power conversion unit 12 includes a PFC circuit 210, an inverter 220, and a filter circuit 230, and the primary device 13 includes a power transmission side resonance circuit 240.

Moreover, the filter circuit 230 may be provided for each primary coil 11 individually, or may be provided collectively for a plurality of primary coils 11.

Moreover, the filter circuit 230 is not limited to a T-type filter, and may be, for example, a band-pass filter in which a coil and a capacitor are connected in series. This is the same for the filter circuit 420 of the vehicle 3 as well.

Further, in the power transmission device 10, when the inverter 220 is connected to the plurality of primary coils 11, each primary device 13 may be provided with a switch for switching the primary coil 11 to be energized. This change-over switch may be provided in the management device 8 beside the road 4, or may be provided near the primary coil 11.

Further, the power transmission side resonance circuit 240 is not limited to a configuration in which the primary coil 11 and the resonant capacitor are connected in series. The primary coil 11 and resonant capacitor may be connected in parallel, or may be a combination of parallel and series. In short, the power transmission side resonance circuit 240 may be configured such that the resonance frequency of the power transmission side resonance circuit 240 matches the drive frequency of the inverter 220, and the connection relationship of its components is not particularly limited. The same applies to the power reception side resonance circuit 410 of the vehicle 3.

Further, the drive frequency of inverter 220 is not limited to 85 kHz, and may be a frequency around 85 kHz. In short, the driving frequency of inverter 220 may be a predetermined frequency band including 85 kHz.

Further, the power transmission device 10 may have a configuration in which a plurality of inverters 220 is connected to the output side power line (DC power line) of the PFC circuit 210.

Further, the foreign object detection device 140 may be provided not only on the ground side but also on the vehicle 3 side. For example, when the foreign object detection device on the vehicle 3 side detects a foreign object or a living body present above the primary coil 11, the power supply request can be stopped until the vehicle 3 passes the primary coil 11.

In addition, in the wireless power transmission system 1, the information transmitted from the vehicle 3 to the supply device 5 using short-range wireless communication includes, in addition to vehicle identification information, a power supply request, a power supply request value, etc. . . . The power supply request is information indicating that power transmission from the primary coil 11 is requested. The required power supply value is a required value of the amount of power transmitted from the supply device 5 to the vehicle 3. Vehicle ECU 330 can calculate the power supply request value based on the SOC of battery 320.

Furthermore, the wireless power transmission system 1 is not limited to the method of feeding power from the ground to the vehicle 3, but can also realize a method of feeding power from the vehicle 3 to the ground. In this case, the rectifier circuit 430 can be replaced with an inverter to realize rectification during power supply and power reception.

Figure 3:
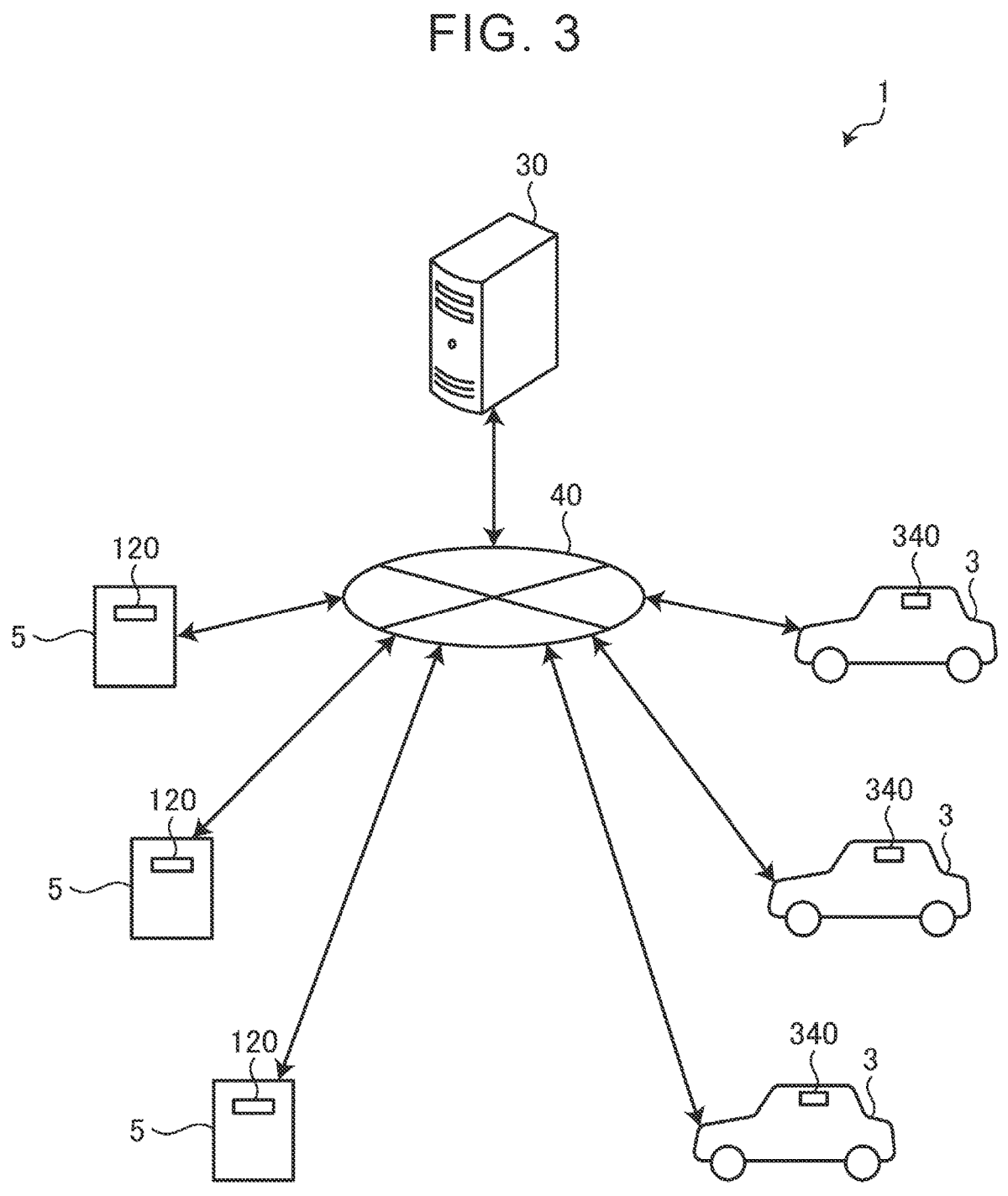

FIG. 3 is a schematic diagram for explaining wide-area wireless communication in the wireless power transmission system.

In the wireless power transmission system 1, the vehicle 3 can communicate with the server 30, and the supply device 5 can communicate with the server 30. The server 30 is connected to a network 40 and can communicate with multiple vehicles 3 and multiple supply devices 5 via the network 40. The network 40 includes a Wide Area Network (WAN), which is a public communication network such as the Internet, a telephone communication network of a mobile phone, and the like.

The vehicle 3 connects to the network 40 by wide area wireless communication using the third communication device 340. Vehicle 3 transmits information to server 30 and receives information from server 30.

The supply device 5 connects to the network 40 by wide area wireless communication using the first communication device 120. The supply device 5 transmits information to the server 30 and receives information from the server 30.

The server 30 processes information regarding wireless power transfer between the vehicle 3 and the supply device 5. The server 30 includes a communication device and a control device. This control device has the same hardware configuration as the power transmission ECU 110. The server 30 creates various lists related to wireless power transfer based on the information received from the vehicle 3 and the information received from the supply device 5. Then, the server 30 provides necessary information regarding wireless power transfer to the necessary vehicles 3 and supply devices 5 at the necessary timing based on various lists. In the wireless power transmission system 1, communication between the vehicle 3 and the supply device 5 via the server 30 is possible using wide area wireless communication. The running vehicle 3 transmits vehicle identification information (vehicle ID) to the server 30, and the server 30 transmits vehicle information linked to the vehicle identification information to the supply device 5.

Figure 4:
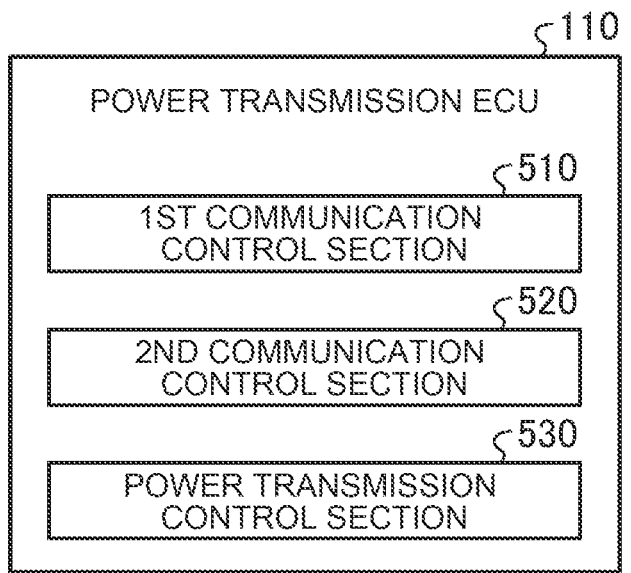
FIG. 4 is a block diagram for explaining the functional configuration of the power transmission ECU.

FIG. 4 is a block diagram showing the functional configuration of the power transmission ECU. Power transmission ECU 110 includes first communication control section 510, second communication control section 520, and power transmission control section 530.

The first communication control unit 510 executes first communication control to control the first communication device 120. The first communication control is to control wide area wireless communication on the side of the supply device 5, and controls communication of the supply device 5 using the first communication device 120. That is, the first communication control controls communication of the management device 8 of the supply device 5. The first communication control controls communication between the supply device 5 and the network 40 and controls communication between the supply device 5 and the server 30 via the network 40. The first communication control unit 510 is a Supply Equipment Communication Controller (SECC).

The second communication control unit 520 executes second communication control to control the second communication device 130. The second communication control controls short-range wireless communication on the side of the supply device 5, and controls communication of the supply device 5 using the second communication device 130. That is, the second communication control controls communication of the segment 7 of the supply device 5. The second communication control controls communication between the supply device 5 and the vehicle 3 as communication not via the network 40. The second communication control unit 520 is a Primary Device Communication Controller (PDCC).

The power transmission control unit 530 executes power transmission control to control the power transmission device 10. Power transmission control is to control power for power transmission, and controls the power conversion unit 12 of the power transmission device 10. Power transmission control unit 530 performs power control to control PFC circuit 210 and inverter 220.

Figure 5:
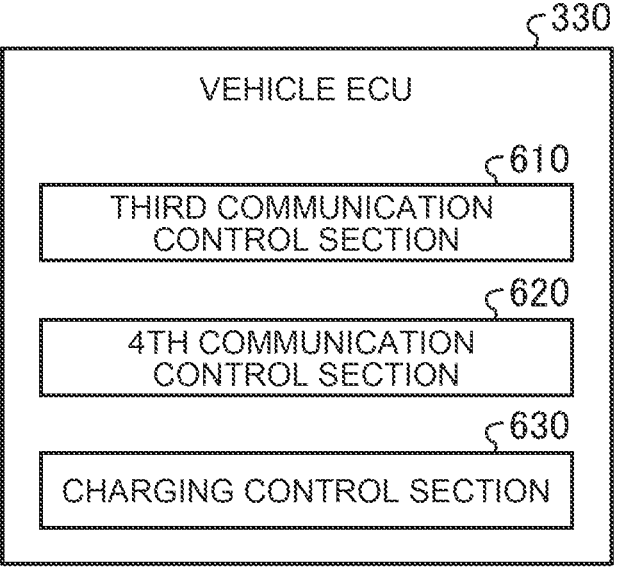
FIG. 5 is a block diagram for explaining the functional configuration of the vehicle ECU.

FIG. 5 is a block diagram showing the functional configuration of the vehicle ECU. Vehicle ECU 330 includes a third communication control unit 610, a fourth communication control unit 620, and a charging control unit 630.

The third communication control unit 610 executes third communication control to control the third communication device 340. The third communication control controls wide area wireless communication on the vehicle 3 side, and controls communication of the vehicle 3 using the third communication device 340. The third communication control controls communication between the vehicle 3 and the network 40 and also controls communication between vehicle 3 and the server 30 via the network 40. The third communication control unit 610 is an EV Communication Controller (EVCC).

The fourth communication control unit 620 executes fourth communication control to control the fourth communication device 350. The fourth communication control controls short-range wireless communication on the vehicle 3 side, and controls communication of the vehicle 3 using the fourth communication device 350. The fourth communication control controls communication between the vehicle 3 and the supply device 5 as communication not via the network 40. A fourth communication control unit 620 is a Secondary Device Communication Controller (SDCC).

Charging control unit 630 executes charging control to control power receiving device 20 and charging relay 310. Charging control includes power control for controlling received power in secondary device 22 and relay control for controlling the connection state between secondary device 22 and battery 320. Charging control unit 630 performs power control to control rectifier circuit 430. Charging control unit 630 executes relay control to switch the open/closed state of charging relay 310.

In the wireless power transmission system 1 configured as described above, wireless power transmission from the supply device 5 to the vehicle 3 is performed in a state where wireless communication is established between the vehicle 3 and the supply device 5. In a state in which the vehicle 3 and the supply device 5 are paired by wireless communication, power is transmitted from the ground-side primary coil 11 to the vehicle-side secondary coil 21 in a non-contact manner. Then, in the vehicle 3, charging control is performed to supply the electric power received by the secondary coil 21 to the battery 320.

Next, the power transfer process (D-WPT process) will be explained with reference to FIG. 6. The power transfer process is structured as a chain of multiple activities and is a process derived from states and corresponding transitions.

Figure 6:
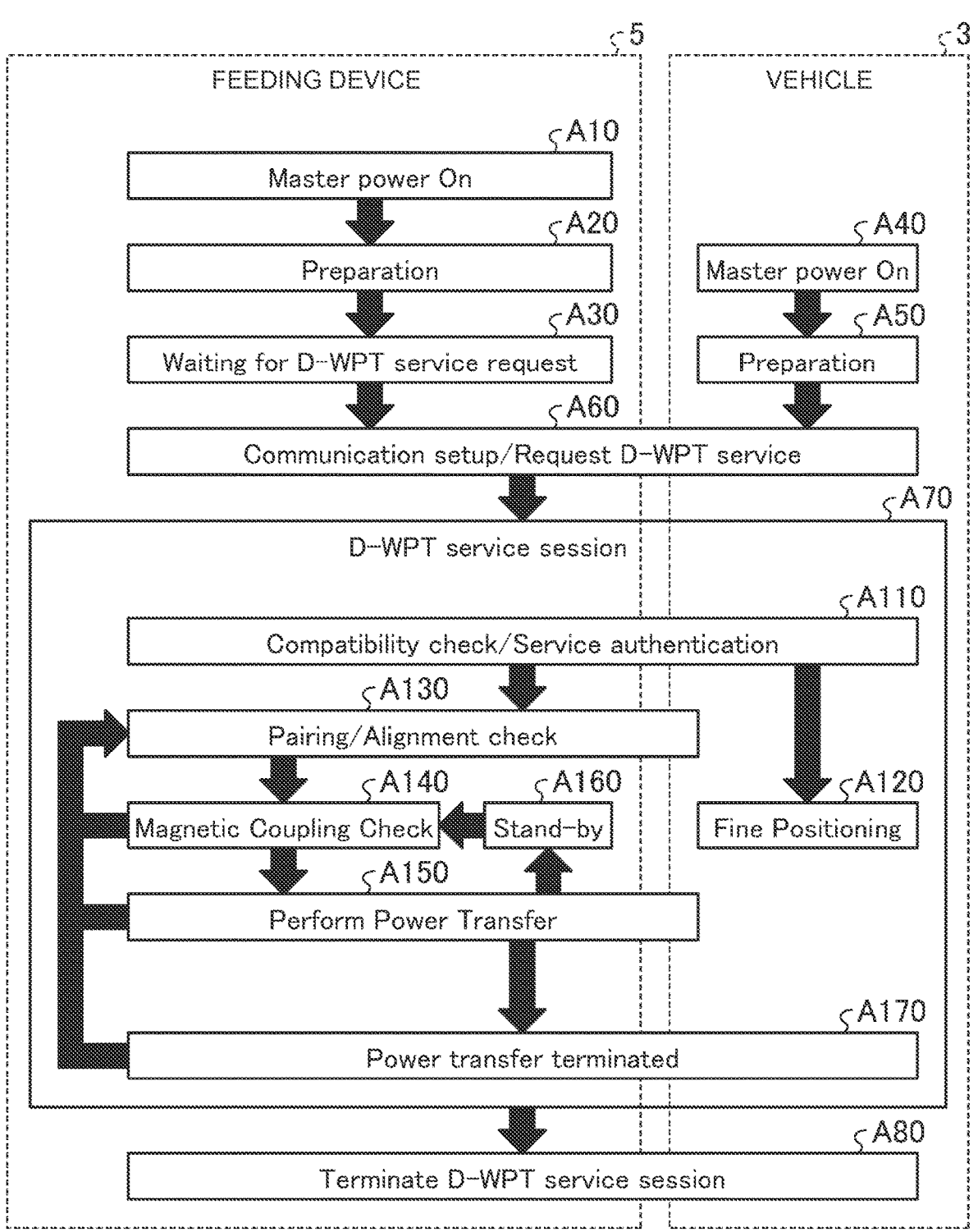
FIG. 6 is a diagram for explaining the power transfer process.

FIG. 6 is a diagram for explaining the power transfer process. In FIG. 6, basic activities are shown to explain the power transfer process. The thick arrows shown in FIG. 6 represent transition lines. The state of the wireless power transmission system 1 in the power transfer process is represented by activities that constitute the power transfer process.

The activities that make up the power transfer process are the power transfer service session (D-WPT service session A70), which is the activity at the stage of power transmission, the activity at the stage before power transmission, the activity at the stage after power transmission, and stages of activities. The activities can be explained separately depending on whether or not there is communication between the supply device 5 and the vehicle 3. The activities can be divided into one that represents the state of only the supply device 5 side without communication, one that represents the state of only the vehicle 3 side without communication, and one that represents the state of both the supply device 5 and vehicle 3 that have communication.

As shown in FIG. 6, the activities include master power on state A10, preparation A20, waiting for a request from vehicle 3 (Waiting for D-WPT service request) A30, master power on state A10, Master power On A40, Preparation A50, Communication setup and Request D-WPT service A60, D-WPT service session (D-WPT) service session) A70, and Terminate D-WPT service session A80.

Preparation A20 is the preparation state of the supply device 5. In preparation A20, the supply device 5 performs circuit activation and safety confirmation without communication with the vehicle 3. The supply device 5 transitions to the preparation A20 when the master power source enters the on state A10. If the supply device 5 activates the circuit and confirms safety in preparation A20, the state changes to Waiting for D-WPT service request A30 from the vehicle 3. On the other hand, when there is a problem with the supply device 5, the supply device 5 notifies the vehicle 3 of information indicating that the wireless power transmission system 1 cannot be used (unusable notification) through wide area wireless communication. The first communication device 120 transmits a usage prohibition notice to the vehicle 3.

Preparation A50 is the preparation state of the vehicle 3. In preparation A50, the vehicle 3 performs circuit activation and safety checks without communication with the supply device 5. When the master power source enters the on state A40, the vehicle 3 transitions to the preparation A50. If the vehicle 3 activates the circuit and confirms safety in preparation A50, the state changes to communication setup and request D-WPT service A60. On the other hand, if there is a problem with the vehicle 3, the vehicle 3 will not start wide area wireless communication and will not perform the subsequent sequences in the D-WPT process.

Figure 7:
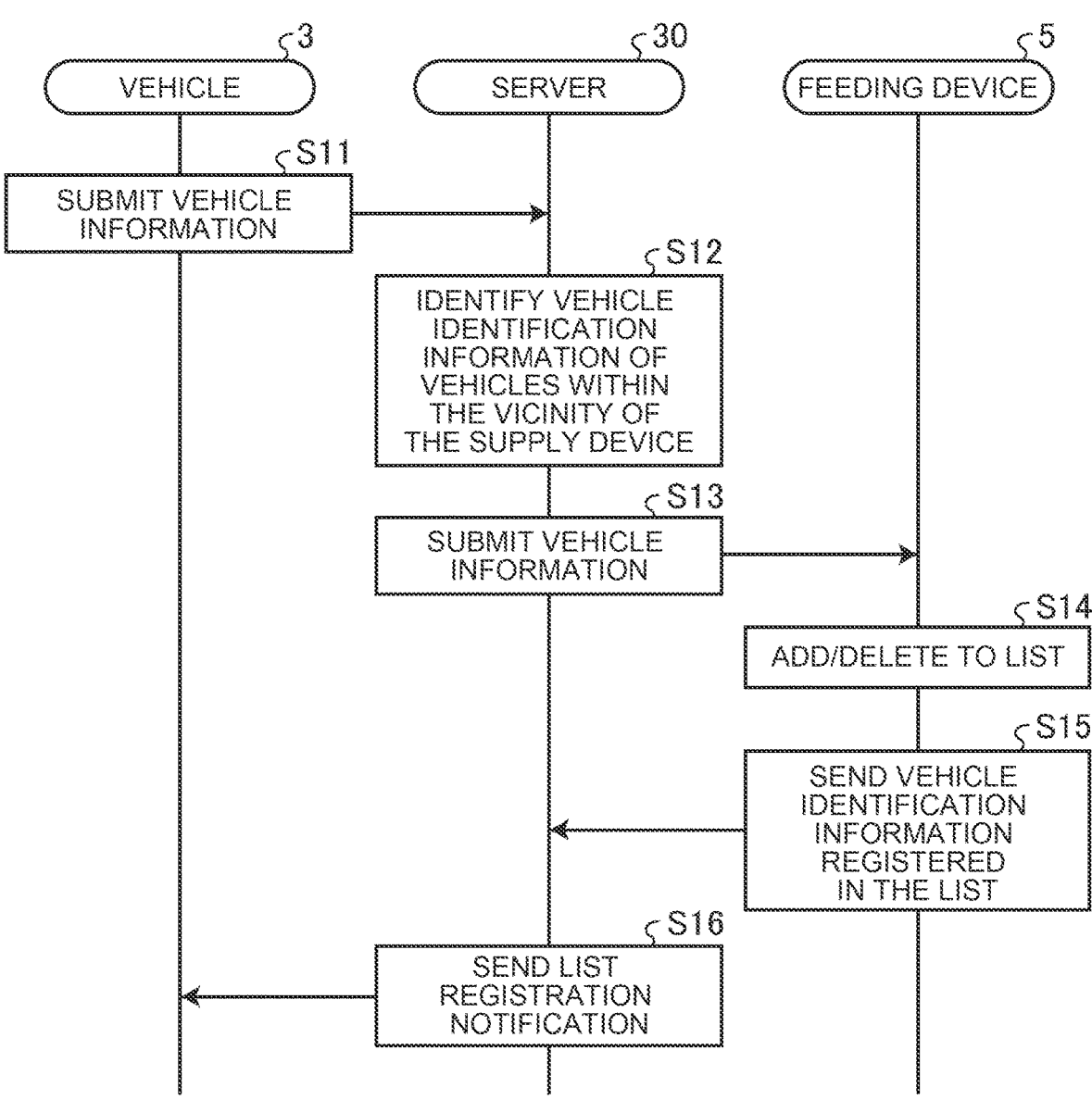
FIG. 7 is a sequence diagram showing a case where communication using wide area wireless communication is carried out between a vehicle and a supply device.

Communication setup and D-WPT service request A60 is initiated by vehicle ECU 330. At communication setup and D-WPT service request A60, vehicle ECU 330 initiates wide area wireless communication. First, when the vehicle 3 transitions from preparation A50 to communication setup and D-WPT service request A60, the third communication device 340 transmits a D-WPT service request signal. The third communication device 340 performs wireless communication with the first communication device 120 corresponding to the D-WPT lane into which the vehicle 3 is scheduled to enter or has entered. The first communication device 120 to communicate with is selected based on the relative positional relationship between the current position of the vehicle 3 and the position of the D-WPT lane. On the supply device 5 side, when the first communication device 120 receives the D-WPT service request signal in the state of waiting for a request from the vehicle 3 A30, the state transitions to the communication setting and D-WPT service request A60. Various types of information in wide area wireless communication and P2PS communication are linked using vehicle identification information. FIG. 7 shows the processing sequence of this communication setup and D-WPT service request A60.

FIG. 7 is a sequence diagram showing a case where communication using wide area wireless communication is performed between the vehicle and the supply device. The vehicle 3 transmits vehicle information to the server 30 (S11). In S11, the third communication device 340 of the vehicle 3 transmits vehicle information to the server 30. The vehicle information includes vehicle identification information, various parameters of the power receiving device 20, current position information of the vehicle 3, and requested power. Vehicle ECU 330 calculates the required power based on the State of Charge (SOC) of battery 320. In S11, the vehicle ECU 330 causes the third communication device 340 to transmit vehicle information at predetermined time intervals. The predetermined time is set according to the distance from the current position of the vehicle 3 to the starting point of the WPT lane. The shorter the distance from the vehicle 3 to the starting point of the WPT lane, the shorter the predetermined time interval.

When the server 30 receives the vehicle information from the vehicle 3, it specifies the vehicle identification information of the vehicle 3 located in the vicinity of the supply device 5 based on the current position information of the vehicle 3 included in the vehicle information (S12). In S12, the server 30 identifies the vehicle 3 positioned within a predetermined vicinity area from the supply device 5 based on the current position information of the vehicle 3 and the position information of the supply device 5. The neighboring area is set within, for example, 500 meters.

After identifying the vehicle identification information of the vehicle 3, the server 30 transmits the vehicle information to the supply device 5 (S13). At S13, the transmission device of the server 30 transmits vehicle information to the supply device 5.

When the supply device 5 receives the vehicle information from the server 30, it registers and deletes the vehicle identification information from the identification information list (S14). In S14, the power transmission ECU 110 registers/deletes the vehicle identification information in the identification information list so that the vehicle identification information linked to the vehicle information is registered in the identification information list without excess or deficiency.

After registering and deleting the vehicle identification information from the identification information list, the supply device 5 transmits the vehicle identification information registered in the identification information list to the server 30 (S15). At S15, the first communication device 120 of the supply device 5 transmits the vehicle identification information to the server 30.

Then, upon receiving the vehicle identification information from the supply device 5, the server 30 transmits a list registration notification to the vehicle 3 corresponding to the vehicle identification information registered in the identification information list (S16). In S16, the communication device of server 30 transmits a list registration notification to vehicle 3. The list registration notification is a notification indicating that the vehicle identification information is registered in the identification information list, and includes identification information of the supply device 5 and position information of the supply device 5.

Thus, when the vehicle 3 starts wide area wireless communication and both the supply device 5 and the vehicle 3 are in the state of communication setting and D-WPT service request A60, the communication setting by wide area wireless communication is successful. With the success of this communication setup, the state transitions to D-WPT service session A70.

Return to FIG. 6. In the D-WPT service session A70, in a state where a communication connection is established between the supply device 5 and the vehicle 3, the power transmission side resonance circuit 240 of the supply device 5 is connected to the power reception side resonance circuit 410 of the vehicle 3 to transmit power in a non-contact manner. The D-WPT service session A70 starts with successful communication setup and ends with the end of communication. When communication ends in the D-WPT service session A70 state, the state transitions to Terminate D-WPT service session A80.

At the end of the D-WPT service session A80, the vehicle 3 ends wide area wireless communication with the supply device 5. The vehicle 3 and the supply device 5 can receive a trigger for the termination of the D-WPT service session A70. Vehicle ECU 330 then prevents D-WPT from starting for secondary device 22 and vehicle 3 until third communication device 340 receives the next notification (D-WPT service request signal).

Here, detailed activities of the D-WPT service session A70 will be explained.

The D-WPT service session A70 includes a Compatibility check and Service authentication A110, a Fine Positioning A120, and a Pairing and Alignment check A130, Magnetic Coupling Check A140, Perform Power Transfer A150, Stand-by A160, and Power transfer terminated A170.

Compatibility check and Service authentication A110 will be described. After successful communication setup, vehicle ECU 330 and power transmission ECU 110 confirm that primary device 13 and secondary device 22 are compatible.

The compatibility check is performed on the supply device 5 side based on information associated with vehicle identification information acquired through communication. Check items include the minimum ground clearance of the secondary device 22, the shape type of the power reception side resonance circuit 410, the circuit topology of the secondary device 22, the self-resonant frequency of the secondary device 22, the number of secondary coils 21, etc.

In Compatibility check and Service authentication A110, first, the vehicle 3 transmits compatibility information of the power receiving device 20 from the third communication device 340 to the supply device 5. The compatibility information of the power receiving device 20 is transmitted by wide area wireless communication. The first communication device 120 of the supply device 5 receives the compatibility information of the power receiving device 20 from the vehicle 3. Then, the first communication device 120 of the supply device 5 transmits the compatibility information of the power transmission device 10 to the vehicle 3. The compatibility information of the power transmission device 10 is transmitted by wide area wireless communication. The third communication device 340 of the vehicle 3 receives the compatibility information of the power transmission device 10 from the supply device 5. These compatibility information can be transmitted and received between the vehicle 3 and the supply device 5 by wide area wireless communication via the network 40 and the server 30.

The elements of the compatibility information that the vehicle 3 sends to the supply device 5 include vehicle identification information, WPT Power Classes, Air Gap Classes, WPT Operating Frequencies, WPT frequency adjustment, WPT Type, WPT Circuit Topology, Fine Positioning Method, Pairing Method, Alignment Method, presence/absence of power adjustment function information etc.

Elements of compatibility information that supply device 5 sends to vehicle 3 include feeder identification, WPT power class, gap class, WPT drive frequency, WPT frequency adjustment, WPT type, WPT circuit topology, detailed alignment method, It includes the pairing method, the alignment method, information on the presence or absence of the power adjustment function, and the like.

Each element name will be explained in detail. In addition, each element of the compatibility information transmitted from the vehicle 3 to the supply device 5 will be explained. Among the compatibility information transmitted from the supply device 5 to the vehicle 3, descriptions of those that overlap with the compatibility information transmitted from the vehicle 3 to the supply device 5 will be omitted.

The gap class is information indicating a gap class from which the secondary device 22 can receive power. The WPT power class is information indicating a power class in which the secondary device 22 can receive power. The WPT drive frequency is information indicating the frequency of received power that the secondary device 22 receives. WPT frequency adjustment is information indicating whether or not the drive frequency can be adjusted. The WPT type is information indicating the shape type of the power reception side resonance circuit 410, and indicates the coil shape of the secondary coil 21. Examples of the WTP type include circular and solenoid. The WPT circuit topology is information indicating the connection structure between the secondary coil 21 and the resonant capacitor. WTP circuit topologies include series and parallel. The detailed alignment method is information indicating by what method the alignment is to be performed. The pairing method is a method in which the vehicle 3 performs pairing to identify the supply device 5. The alignment method indicates a method of confirming the relative positions of the secondary device 22 and the primary device 13 before starting power transmission.

Fine positioning A120 will be described. Vehicle 3 performs Fine Positioning A120 prior to Pairing and Alignment check A130 or in parallel with these activities. When vehicle ECU 330 determines that vehicle 3 approaches or enters the area where supply device 5 is installed (WPT lane), it starts Fine Positioning A120.

Vehicle ECU 330 guides vehicle 3 to align primary device 13 and secondary device 22 within a range that establishes sufficient magnetic coupling for wireless power transfer.

Fine Positioning A120 is basically performed manually or automatically on the vehicle 3 side. Fine Positioning A120 can cooperate with ADAS (Automatic Driving Assistance System).

Fine Positioning A120 activity then continues until the vehicle 3 leaves the D-WPT charging site or the state changes to end of communication, and the location data transmitted from the supply device 5 to the vehicle 3 by wide area wireless communication is It can be performed based on alignment information. This end of communication is the end A80 of the D-WPT service session.

Pairing and Alignment check A130 will now be described. Here, pairing and alignment check will be explained separately.

Explain pairing. The P2PS interface for short range wireless communication ensures that the primary device 13 and the secondary device 22 are uniquely paired. The pairing state process is as follows.

First, the vehicle ECU 330 recognizes that the vehicle 3 has approached or entered the D-WPT lane. For example, the vehicle ECU 330 has map information including D-WPT lanes, compares it with the position information of the own vehicle obtained by the GPS receiver 360, and recognizes approach or entry based on the linear distance. The vehicle 3 transmits to the server 30 which D-WPT lane it has approached via wide area wireless communication. In short, the third communication device 340 notifies the cloud of a signal indicating that the vehicle 3 is approaching one of the D-WPT lanes. Further, if the vehicle ECU 330 recognizes the approach or entry of the vehicle 3 into the D-WPT lane, the fourth communication device 350 will start transmitting the modulated signal at regular intervals for pairing the primary device 13 and the secondary device 22.

Furthermore, the supply device 5 may recognize that the vehicle 3 has approached or entered the D-WPT lane using information acquired from the server 30 through wide area wireless communication. The server 30 allocates the vehicle identification information of the vehicle 3 approaching on each D-WPT lane to the supply device 5 corresponding to that lane. Since the supply device 5 only needs to refer to the vehicle identification information whose number has been narrowed down by the server 30, the authentication process can be completed in a short time. When the supply device 5 recognizes that the vehicle 3 is approaching the D-WPT lane, the second communication device 130 goes into standby mode. In standby mode, it waits to receive a modulated signal from the fourth communication device 350 of the vehicle 3. This modulated signal includes vehicle identification information.

When the second communication device 130 receives the modulated signal from the vehicle 3, the supply device 5 transmits the vehicle identification information received through short-range wireless communication and wide-area wireless communication with the plurality of vehicles 3 approaching the D-WPT lane. The vehicle identification information in the identification information list obtained as a result is compared. By this comparison, the supply device 5 identifies the vehicle 3.

When the vehicle ECU 330 recognizes that the vehicle 3 is out of the D-WPT lane, it stops transmitting the modulated signal from the fourth communication device 350. Vehicle ECU 330 can determine whether the D-WPT lane has been passed based on the map information and the position information of the host vehicle.

When the supply device 5 determines that the vehicle 3 is not traveling in the D-WPT lane or determines that the vehicle 3 is not approaching the D-WPT lane, the modulated signal from the fourth communication device 350 stop waiting for Pairing is performed to the primary device 13 until the vehicle 3 exits the D-WPT charging site or the state changes to end of communication. When Pairing is complete, the state transitions to Alignment check.

The alignment check will be explained. The purpose of the alignment check is to ensure that the lateral distance between the primary device 13 and the secondary device 22 is within an acceptable range. The alignment check is performed using short range wireless communication (P2PS).

Alignment checks continue to be performed based on P2PS until the vehicle 3 leaves the D-WPT charging site or the state changes to End of Communication. The results of the alignment check can be transmitted from the first communication device 120 to the third communication device 340 via wide area wireless communication.

Magnetic Coupling Check A140 will be explained. In Magnetic Coupling Check A140, the supply device 5 confirms the magnetic coupling state and confirms that the secondary device 22 exists within the allowable range. When Magnetic Coupling Check A140 ends, the state transitions to Perform Power Transfer A150.

Perform Power Transfer A150 will be explained. In this state, the supply device 5 transmits power to the power receiving device 20. The power transmission device 10 and the power receiving device 20 need to have the ability to control the transmitted power (transmitted power and received power) for the usefulness of the MF-D-WPT and the protection of the power receiving device 20 and the battery 320. Greater power transfer helps power receiving device 20 travel longer distances without static wireless charging and conductive charging. However, the capacity of the battery 320 varies depending on the vehicle type of the vehicle 3, and the power demand for driving may fluctuate abruptly. An example of this sudden change is sudden regenerative braking. When regenerative braking is performed while driving on the D-WPT lane, priority is given to regenerative braking, so that in addition to regenerative power, received power from power receiving device 20 is supplied to battery 320. In this case, in order to protect the battery 320 from overcharging, the power receiving device 20 needs to adjust the transmitted power.

Despite the necessity of power control, communication is not newly started between the supply device 5 and the power receiving device 20 in this state. This is because communication can impair response and accuracy in power control due to its instability and latency. Therefore, the supply device 5 and the power receiving device 20 perform power transmission and control thereof based on known information up to this state.

The supply device 5 uses wide area wireless communication in advance to increase the transmission power for the magnetic coupling check in response to the power request transmitted from the third communication device 340. The supply device 5 attempts to keep the current and voltage fluctuations within its limits while maximizing the power transferred during the transition.

The power receiving device 20 basically receives the transmitted power from the power transmission device 10 without any control. However, the power receiving device 20 starts control when the transmitted power exceeds or is about to exceed the limit, such as the rated power of the battery 320, which varies depending on the state of charge and the power demand for driving the vehicle 3. Further, power control in the vehicle ECU 330 is also required to cope with malfunctions in wide area wireless communication. This malfunction leads to a contradiction between the power control target in the primary device 13 and the request from the third communication device 340, and sudden failure of the power receiving device 20 and the battery 320 during power transmission. The power receiving device 20 controls the transmitted power based on the power request rate notified by the first communication device 120.

Power requirements are determined based on compatibility check information such as vehicle 3 and primary device 13 WPT circuit topology, geometry, ground clearance, EMC (electromagnetic compatibility). The magnetic field varies depending on these specifications, and it is necessary to transmit power within a range that satisfies EMC.

Power control in power transmission ECU 110 and power receiving device 20 may interfere with each other. In particular, it may interfere if the supply device 5 attempts to achieve a power demand greater than the current power limit at the power receiving device 20 via wide area wireless communication. An example of this is rapid regeneration control using a relatively small battery 320 in the vehicle 3. If possible, it is desirable that the supply device 5 be able to detect mismatches between power control goals and limits and adjust the power transfer to resolve the mismatches.

For example, if a foreign object is detected on the primary device 13 by the foreign object detection device 140, or if the coupling coefficient of magnetic coupling becomes low due to misalignment of the secondary device 22, the secondary device 22 still remains on the primary device 13. If power transfer is briefly interrupted while on, the state transitions to Stand-by A160. Note that if the vehicle 3 is provided with a foreign object detection device, the foreign object may be detected on the vehicle 3 side.

When the secondary device 22 passes over the primary device 13, the state transitions to Power transfer terminated A170. In this case, less power is transferred because the magnetic coupling between the two devices is weaker. Since the supply device 5 can detect that the magnetic coupling has weakened by monitoring the transmitted power, the supply device 5 basically determines the state transition to Power transfer terminated A170, and then the power Start dropping voltage to stop transmission.

Stand-by A160 will be explained. In this state the power transfer is briefly interrupted for some reason and when the D-WPT is ready in both the vehicle 3 and the supply device 5 the state returns to Perform Power Transfer A150. If there is a possibility of interrupting power transfer, the state will be Stand-by A160.

Figure 8:
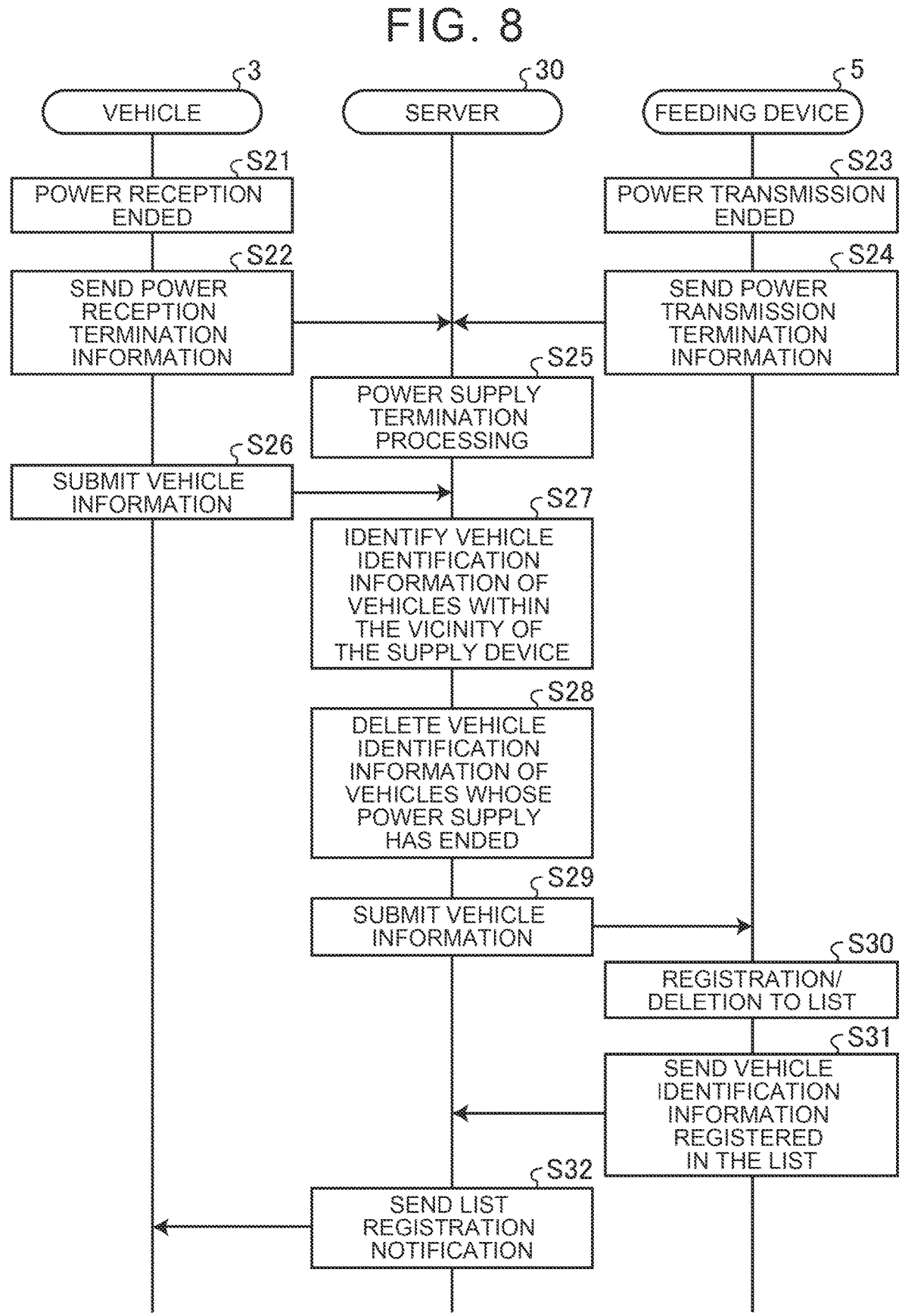
FIG. 8 is a sequence diagram showing the operation after the power supply from the supply device to the vehicle while running is completed.

Power transfer terminated A170 will be explained. In this state, the supply device 5 reduces the transmitted power to zero and retains or uploads power transmission result data such as total transmitted power, power transmission efficiency, and failure history. Each data is tagged with vehicle identification information. Finally, the supply device 5 deletes the vehicle identification information of the vehicle 3 that has passed through the D-WPT lane. This allows the supply device 5 to be ready for subsequent pairing and power transfer to another vehicle. FIG. 8 shows the processing sequence for Power transfer terminated A170.

FIG. 8 is a sequence diagram showing the operation after the power supply from the supply device to the vehicle during running is completed. When the power receiving device 20 of the vehicle 3 finishes receiving power from the supply device 5 (S21), the vehicle 3 transmits power receiving end information to the server 30 (S22). In S22, power reception end information is transmitted from the third communication device 340 of the vehicle 3. The power reception end information includes, as information related to power reception from the supply device 5, vehicle identification information of the vehicle 3, power received from the supply device 5, power reception efficiency, and an abnormality detection result, for example.

The supply device 5 ends power transmission to the vehicle 3 when the process of S21 is performed (S23). The processing in S21 and the processing in S23 may or may not be performed simultaneously. When the process of S23 is executed, the supply device 5 transmits power transmission end information to the server 30 (S24). In S24, power transmission end information is transmitted from the first communication device 120 of the supply device 5.

When receiving the power reception end information from the vehicle 3 and the power transmission end information from the supply device 5, the server 30 performs power supply end processing for ending power supply from the supply device 5 to the vehicle 3 (S25). In the power supply termination process, based on the power reception termination information and the power transmission termination information, a process of calculating the amount of power supplied from the supply device 5 to the vehicle 3 and a process of charging the user of the vehicle 3 based on the calculated amount of supplied power are performed.

Furthermore, the vehicle 3 transmits vehicle information to the server 30 regardless of the power supply termination process (S26). In S26, vehicle information is transmitted from the third communication device 340 of the vehicle 3.

When the server 30 receives the vehicle information from the vehicle 3 after performing the power supply termination process, the server 30 specifies the vehicle identification information of the vehicle 3 located within the vicinity of each supply device 5 based on the vehicle information (S27).

Then, if the power supply termination process for a certain vehicle 3 has already been performed in a certain supply device 5, the server 30 uses the vehicle identification information of the vehicle 3 in the vicinity area of this supply device 5 specified in the process of S27, the vehicle identification information of the vehicle 3 for which the power supply termination process has already been performed is deleted (S28).

After that, the server 30 transmits to each supply device 5 the vehicle information linked to the vehicle identification information that has not been deleted in the process of S28, among the vehicle identification information of the vehicle 3 identified as being located in the vicinity area of each supply device 5 (S29).

After the vehicle information is transmitted to each supply device 5 in the process of S29, when the supply device 5 receives the vehicle information from the server 30, the supply device 5 registers/deletes the vehicle identification information in the identification information list (S30). The process at S30 is similar to the process at S14 in FIG. 7. After that, the supply device 5 transmits the vehicle identification information registered in the identification information list to the server 30 (S31). The process at S31 is similar to the process at S15 in FIG. 7.

Then, upon receiving the vehicle identification information from the supply device 5, the server 30 transmits a list registration notification to the vehicle 3 corresponding to the vehicle identification information registered in the identification information list (S32). The process at S32 is similar to the process at S16 in FIG. 7.

As a result, when the processing shown in FIG. 8 is performed, vehicle identification information is registered in the identification information list for the vehicle 3 located in the vicinity area of each supply device 5, for which the power supply from the supply device 5 is not finished, and for which no identification information erasure request has been made. Then, when the vehicle identification information of the vehicle 3 is registered in the identification information list of any supply device 5, the vehicle 3 receives the list registration notification. Therefore, the vehicle ECU 330 can determine that the own vehicle is registered in any of the supply devices 5 by receiving the list registration notification. When the vehicle 3 moves out of the vicinity of the supply device 5, the vehicle identification information of the vehicle 3 is deleted from the identification information list of the supply device 5.

Return to FIG. 6. Further, at Power transfer terminated A170, the power receiving device 20 does not need to do anything to reduce the transmitted power to zero. The P2PS interface is kept active when the vehicle 3 is in the D-WPT lane, and the state of the power receiving device 20 automatically transitions to pairing for power transmission from the next primary device 13. The state transitions from Power transfer terminated A170 to Pairing and Alignment check A130 as the transition line shown in FIG. 6. As shown in FIG. 6, when a predetermined transition condition is satisfied, Magnetic Coupling Check A140 can transition to Pairing and Alignment check A130, and Perform Power Transfer A150 can transition to Pairing and Alignment check A130. Pairing may be performed for each of the plurality of primary coils 11 individually, or may be performed at a representative point by bundling the plurality of primary coils 11.

In the D-WPT service session A70, when there is no D-WPT request from the vehicle ECU 330, or a series of states from the communication setting and D-WPT service request A60 to the Power transfer terminated A170 are prohibited. In this case, the process transitions to D-WPT service session end A80, and the wide area wireless communication between the first communication device 120 and the third communication device 340 is stopped. For example, the D-WPT shuts down when the state of charge in battery 320 is too high or when power receiving device 20 is too hot for continuous power transfer. Such unnecessary D-WPTs can be disabled by simply deactivating the P2PS interface. However, by stopping the wide area wireless communication, the power transmission ECU 110 can release the memory occupied for the vehicle 3 without requiring the D-WPT by terminating the established wide area wireless communication.

Furthermore, the D-WPT service session A70 is not limited to transitions like the transition line shown in FIG. 6. When the D-WPT service session A70 completes the activities after Pairing and Alignment check A130, if the conditions are met for the power transfer process to remain in the D-WPT service session A70, the process does not transition to end the D-WPT service session A80, but transitions to Compatibility check and Service authentication A110. For example, if a predetermined transition condition is met in the state of Magnetic Coupling Check A140, the state can transition to Compatibility check and Service authentication A110. Transition of each activity in the D-WPT service session A70 is controlled by the control device of the wireless power transmission system 1. The control device of wireless power transmission system 1 includes power transmission ECU 110 and vehicle ECU 330. Power transmission ECU 110 includes a function as a control device for supply device 5. Vehicle ECU 330 includes a function as a control device for power receiving device 20.

Figure 9:
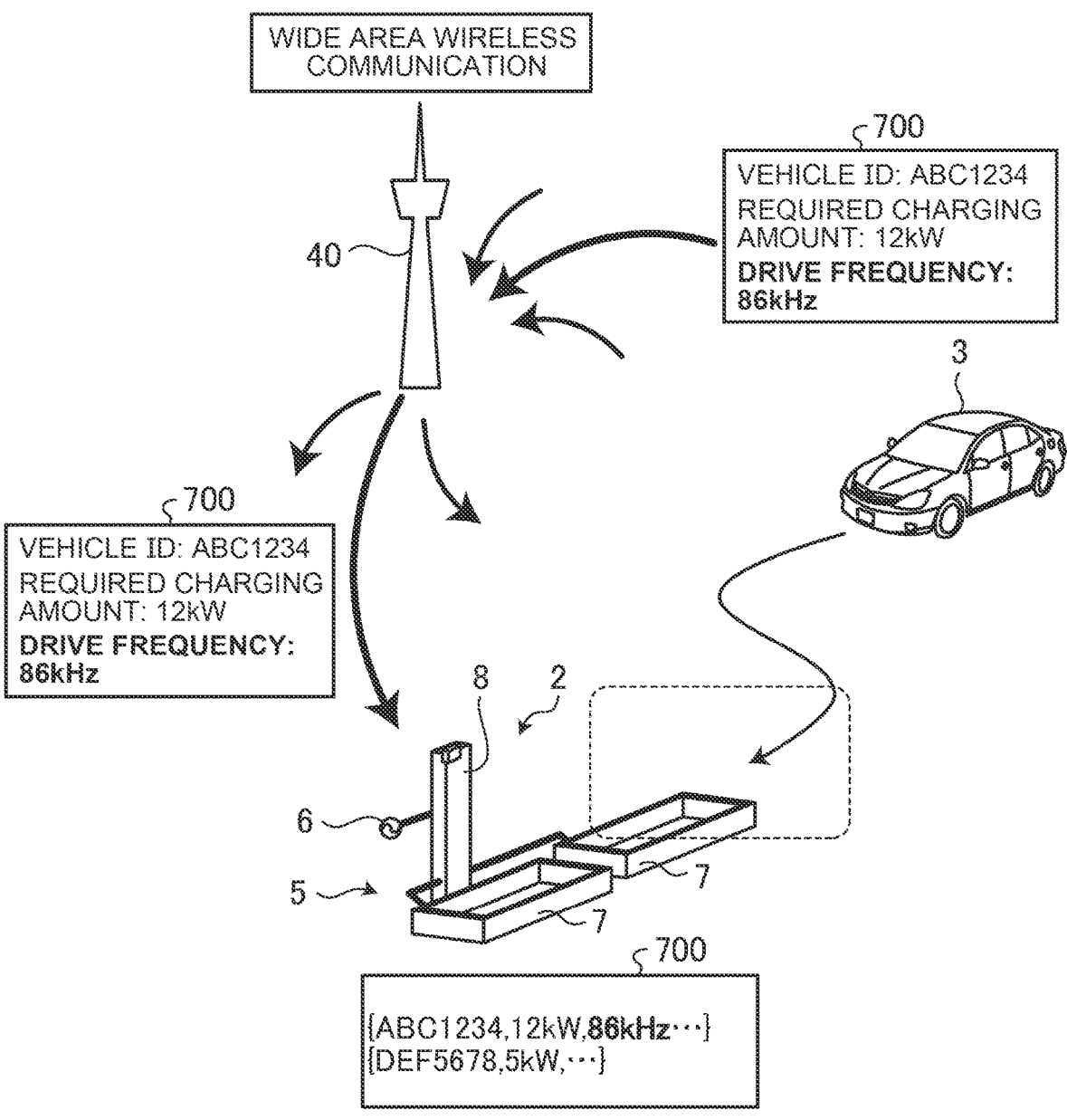
FIG. 9 is a diagram for explaining transmitting vehicle information to a ground-side supply device using wide area wireless communication.

FIG. 9 is a diagram for explaining transmitting vehicle information to a ground-side supply device using wide area wireless communication.

In the wireless power transmission system 1, vehicle information 700 is transmitted from the vehicle 3 to the supply device 5 using wide area wireless communication. The vehicle 3 generates vehicle information 700 while driving, and transmits the vehicle information 700 to the network 40. Vehicle information 700 includes vehicle identification information (vehicle ID), required power (required charge amount), and drive frequency.

Vehicle ECU 330 calculates the optimal drive frequency based on the battery voltage of vehicle 3 and the required power. Battery voltage is the voltage of battery 320. The required power is the required charging amount when charging the battery 320 by wireless power transmission. The drive frequency determined based on the battery voltage and the required power is referred to as a first drive frequency. The first drive frequency is the optimum drive frequency for the vehicle 3 side, which is the power receiving side, in wireless power transmission.

In order to achieve optimal efficiency in transmitting power from the ground side supply device 5 to the vehicle 3, it is desirable that the resonant frequency of the power reception side resonance circuit 410 and the resonant frequency of the power transmission side resonance circuit 240 match, and the resonant frequency of the power transmission side resonance circuit 240 and the drive frequency of the inverter 220 match. However, in the wireless power transmission system 1, the driving frequency that can achieve optimal efficiency changes due to variations in parameters.

Figure 10:
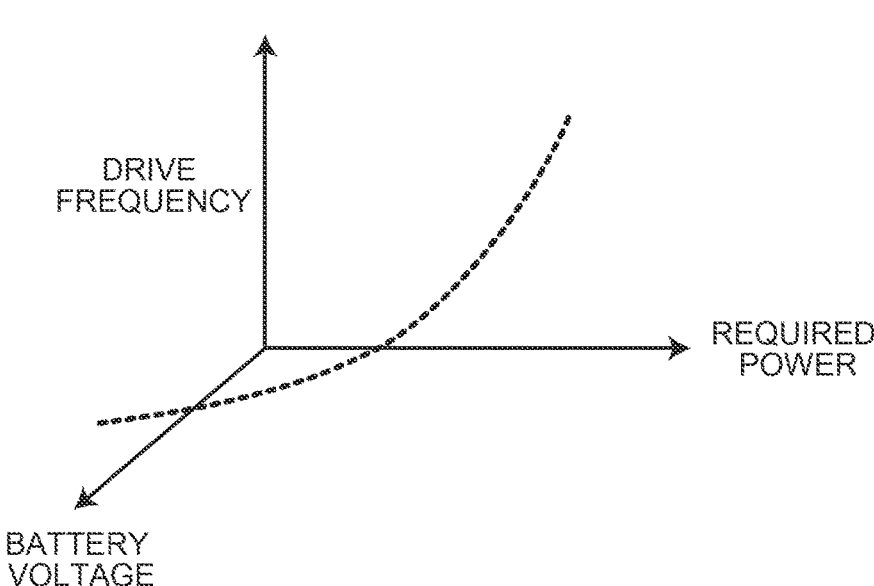
FIG. 10 is a diagram showing the relationship between battery voltage, required power, and drive frequency.
Figure 11:
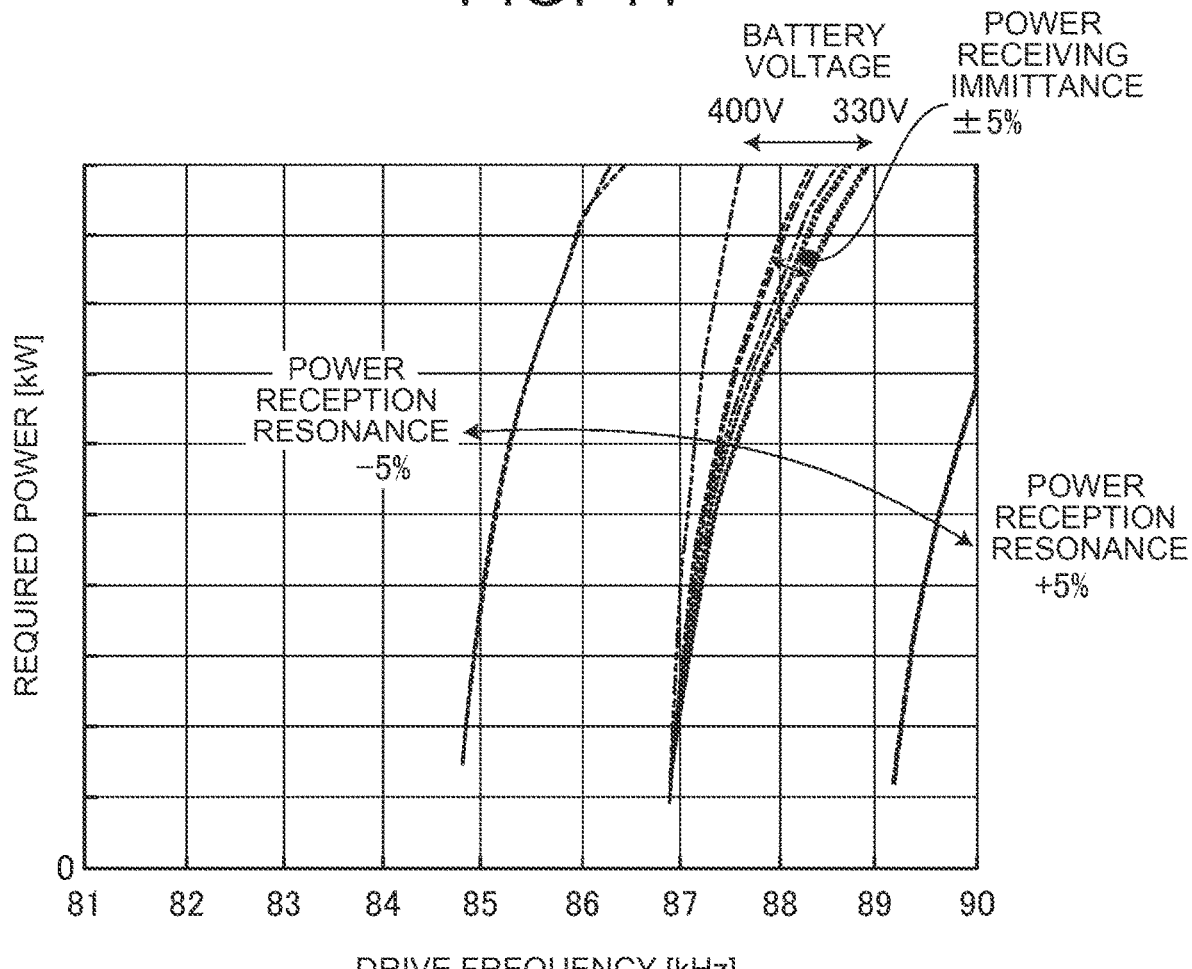
FIG. 11 is a diagram showing the relationship between battery voltage, required power, and drive frequency organized by required power and drive frequency.

With regard to this change in drive frequency, the inventors' knowledge has revealed that when the variation factors are sorted out, it is all determined by the parameters on the vehicle 3 side. Furthermore, for the same vehicle 3, as shown in FIGS. 10 and 11, it has become clear that once the battery voltage and required driving force are determined, the driving frequency that provides the optimum efficiency can be determined. That is, it has become clear that on the vehicle 3 side, the optimal drive frequency is uniquely determined according to the battery voltage and power consumption (required power).

As shown in FIG. 11, regarding the relationship between the drive frequency and the required power, the driving frequency becomes higher as the required power increases. Regarding the relationship between the drive frequency and the battery voltage, the drive frequency increases as the battery voltage decreases.

Since the wireless power transmission system 1 can target a wide variety of vehicles 3, each vehicle 3 has an optimal drive frequency based on the battery voltage and required power. Therefore, as shown in FIG. 9, the wireless power transmission system 1 is configured to transmit the optimal drive frequency for the vehicle 3 to the ground-side supply device 5 using wide area wireless communication. At that time, vehicle 3 transmits vehicle information 700 using wide area wireless communication.

Vehicle information 700 transmitted from vehicle 3 is transmitted to supply device 5 via network 40. For example, vehicle information is provided from the vehicle 3 to the supply device 5 via the server 30. When the server 30 receives the vehicle information 700, it transmits the vehicle information 700 to the supply device 5.

When the supply device 5 receives the vehicle information 700 from the server 30, it updates the identification information list. In the identification information list, required power (required charging power) and drive frequency are registered in association with vehicle identification information.

Then, the supply device 5 changes the drive frequency of the inverter 220 to the optimum drive frequency for the vehicle 3 and performs wireless power transmission. Since the supply device 5 transmits power at a drive frequency that is optimal for the vehicle 3 side, wireless power transmission with optimal efficiency is possible.

Figure 12:
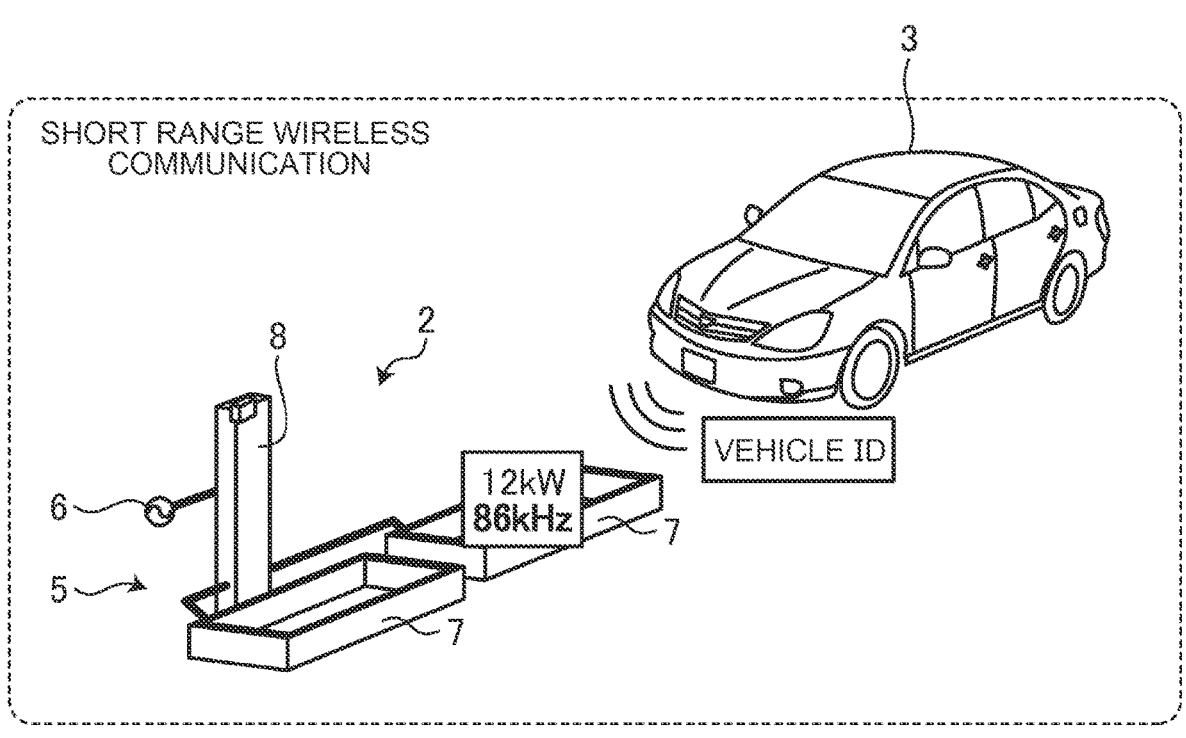
FIG. 12 is a diagram for explaining transmitting vehicle identification information to a supply device on the ground side using short-range wireless communication.

Specifically, when the vehicle 3 approaches the supply device 5 on the ground side, the vehicle 3 transmits vehicle identification information to the supply device 5 using short range wireless communication, as shown in FIG. 12. When the supply device 5 receives the vehicle identification information through short-range wireless communication, it uses the vehicle identification information to refer to the identification information list and adjusts the driving frequency of the inverter 220 so that the driving frequency is linked to the corresponding vehicle identification information.

In short, power transmission ECU 110 refers to vehicle information previously acquired through wide area wireless communication, based on vehicle identification information acquired through short area wireless communication. Power transmission ECU 110 identifies information corresponding to vehicle identification information from the vehicle information, and identifies its drive frequency. Power transmission ECU 110 controls the drive frequency of inverter 220 to match the drive frequency based on vehicle information.

For example, when the drive frequency set for the inverter 220 is 85 kHz, when the supply device 5 acquires vehicle information indicating that the optimal drive frequency for the vehicle 3 is 86 kHz, the power transmission ECU 110 controls the inverter 220. The driving frequency can be changed from the predetermined frequency (85 kHz) to the optimum driving frequency (86 kHz) from the vehicle 3 side. When power transmission ECU 110 receives the vehicle identification information through short-range wireless communication, power transmission ECU 110 changes the drive frequency of inverter 220 from the previous frequency to the optimal drive frequency. When the vehicle 3 passes over the segment 7, the supply device 5 transmits electric power from the segment 7 to the vehicle 3 in a non-contact manner while driving the inverter 220 at the changed drive frequency.

Furthermore, when wireless power transmission is performed, the control device of the wireless power transmission system 1 performs feedback control to check whether the power transmission efficiency is actually increasing by changing the driving frequency of the inverter 220 according to information from the vehicle 3 side. Implement. The power transmission ECU 110 on the ground side performs feedback control to check whether the power transmission efficiency is high before and after changing to the optimal drive frequency for the vehicle 3 side.

In the feedback control, on the ground side, it is determined whether the inverter current and the inverter voltage of the inverter 220 controlled to the changed drive frequency are passing through zero at the same timing. The supply device 5 includes a current sensor that detects inverter current and a voltage sensor that detects inverter voltage. The current sensor outputs an inverter current detection signal to power transmission ECU 110. The voltage sensor outputs an inverter voltage detection signal to power transmission ECU 110. Power transmission ECU 110 determines whether the inverter current and inverter voltage cross zero at the same timing, based on signals input from the current sensor and the voltage sensor. If the zero-crossing timings of the current and voltage of inverter 220 driven at the changed drive frequency match, power transmission ECU 110 determines that the changed state is optimal efficiency.

Furthermore, in the feedback control, the determination result by the supply device 5 on the ground side is notified to the vehicle 3 side as feedback information, and the vehicle ECU 330 learns the drive frequency according to the notified feedback information. If the judgment result on the ground side according to the transmitted optimal drive frequency is information indicating that the efficiency is optimal, the vehicle ECU 330 determines whether the information (map, etc.) used to calculate the drive frequency is optimal. Learning that efficiency information. On the other hand, if the judgment result on the ground side according to the transmitted optimal drive frequency is information indicating that the efficiency is not optimal, the vehicle ECU 330 corrects the information (map, etc.) used for calculation of the drive frequency, based on the notified feedback information.

For example, when the vehicle ECU 330 sets the optimum drive frequency to 86 kHz and transmits this information to the supply device 5 via wide area wireless communication, the judgment result notified from the ground side indicates that the drive frequency is 85 kHz rather than 86 kHz. Assume that the information indicates high efficiency. In this case, learning is performed so that the optimal drive frequency is determined to be 85 kHz instead of 86 kHz based on the battery voltage and required power used for the calculation. As an example, vehicle ECU 330 adjusts the relationship in the map shown in FIG. 11, that is, the correlation between battery voltage, required power, and drive frequency. This feedback control allows the vehicle 3 to calculate the optimum drive frequency.

As explained above, according to the embodiment, it is possible to set the drive frequency based on the battery voltage and the required power, which are parameters on the vehicle 3 side, and to control the inverter 220 on the ground side so as to set the drive frequency. As a result, wireless power transmission is performed for each vehicle 3 using an optimal drive frequency according to the battery voltage and required power. As a result, power transmission efficiency can be improved.

Note that the supply device 5 can control the inverter 220 so that the plurality of segments 7 has different drive frequencies for each segment 7.

Further, when the vehicle 3 includes a plurality of secondary coils 21, an optimal drive frequency can be set for each secondary coil 21. In this case, the vehicle information 700 includes a plurality of pieces of information on drive frequencies depending on the secondary coil 21.

What is claimed is:

1. A vehicle control device mounted on a vehicle including a power receiving device that receives power transmitted from a supply device on a ground side in a non-contact manner, and a battery charged by the power received by the power receiving device, the vehicle control device comprising a control unit that executes:

setting a drive frequency determined based on voltage of the battery and required power on the vehicle side as a first drive frequency;

transmitting the first drive frequency to the supply device using wide area wireless communication;

receiving by the power receiving device the power transmitted in a non-contact manner while an inverter included in the supply device is controlled to the first drive frequency by the supply device that has received the first drive frequency, and charging the power to the battery; and performing feedback control to determine whether power transmission efficiency is higher after changing the drive frequency of the inverter to the first drive frequency than before changing the drive frequency, wherein the higher the voltage of the battery, the lower the first drive frequency, and the higher the required power, the higher the first drive frequency.

2. The vehicle control device according to claim 1, wherein the control unit receives, from the supply device, feedback information regarding the power transmission efficiency when the inverter is driven at the first drive frequency, and the control unit adjusts a correlation between the voltage of the battery, the required power, and the first drive frequency based on the feedback information.

* * * * *